United States Patent
Whikehart et al.

(12) 
(10) Patent No.: US 6,173,003 B1
(45) Date of Patent: Jan. 9, 2001

(54) DITHER NOISE SOURCE WITH NOTCHED FREQUENCY SPECTRUM

(75) Inventors: J. William Whikehart, Novi; Terry Robert Altmayer, Dearborn, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/048,223

(22) Filed: Mar. 26, 1998

(51) Int. Cl.[7] .................................................. H04B 1/69
(52) U.S. Cl. ........................ 375/130; 708/250; 708/252
(58) Field of Search .................................. 375/130, 316; 708/250, 252

(56) References Cited

U.S. PATENT DOCUMENTS

| 5,073,777 | 12/1991 | Fukuhara et al. . |
| 5,408,233 | 4/1995 | Gannon et al. . |
| 5,493,297 | 2/1996 | Nguyen et al. . |
| 5,684,482 | * 11/1997 | Galton ................................ 341/144 |
| 5,748,677 | * 5/1998 | Kumar ................................ 375/285 |

OTHER PUBLICATIONS

Principles of Digital Audio, Second Edition, Ken C. Pohlmann, 1985 & 1989, Chapter 3, pp. 64–70.

* cited by examiner

*Primary Examiner*—Don N. Vo
(74) *Attorney, Agent, or Firm*—Mark L. Mollon

(57) ABSTRACT

A dither signal source generates a dither signal which is spectrally shaped in a desired manner. One or more notches are located at desired frequencies while minimizing the hardware required in a digital signal processor for generating the digital random noise for the dither signal source. The notched dither signal can be added to an analog signal prior to digitization to reduce quantization distortion without adding noise to the frequency range of interest.

12 Claims, 2 Drawing Sheets

DITHER NOISE SOURCE WITH NOTCHED FREQUENCY SPECTRUM

BACKGROUND OF THE INVENTION

The present invention relates in general to a dither noise source for reducing quantization error in digital systems, and more specifically, to generating a dither noise signal with a notched frequency spectrum.

The use of dither is a well known technique for reducing distortion in digitized signals that otherwise arises when low level analog signal variations smaller than the quantization interval are present in an analog signal being digitized by an analog-to-digital converter. The addition of a small analog noise signal to the analog signal being digitized randomizes the quantization error, thereby reducing the distortion. Although a small level of white noise is added to the signal, the effect on the audible quality of sound is much less objectionable than the distortion. It is known, furthermore, that the noise effects of dither can be reduced by spectrally shaping a dither noise signal to avoid frequency content in the main frequencies of interest in the signal being digitized. Such spectral shaping, however, has required excessive processing to generate an acceptable dither signal. In order to make generation of such spectrally-shaped dither noise practical, an efficient manner of generating the dither noise is needed.

In the case of an AM/FM radio receiver in which analog intermediate frequency signals are digitized for demodulation and subsequently processed in a digital signal processor (DSP), the analog signal of interest has a different frequency spectrum depending upon whether AM or FM is being received. AM reception typically utilizes an intermediate frequency of 450 kHz while FM reception typically uses an intermediate frequency of 10.7 MHz. Thus, a dither noise source for adding to the intermediate frequency signal would need to have a spectral shape avoiding these two separate frequency bands. Relying solely on filtering of a white noise dither signal would be extremely inefficient and costly.

SUMMARY OF THE INVENTION

The present invention has the advantage that a dither signal is generated in an efficient manner with minimum reliance upon filtering while providing a desired spectral shape of the dither signal.

Specifically, the present invention provides a dither signal source for generating a dither signal in a digital processing system wherein a digital signal is processed having a sample rate $f_s$, and wherein the dither signal is spectrally shaped. The dither signal source comprises a digital random noise generator producing a digital random noise sequence at a sample rate $f_n$ where $$f_n = \frac{f_s}{n}$$

with n equal to an integer. A zero-order hold receives the digital random noise sequence and produces a held output for n samples at the sample rate $f_s$. The held output provides a modified digital random noise sequence having a spectral shape including at least one notch.

DETAILED DESCRIPTION OF PREFERRED EMBODIMENTS

Figure 1:
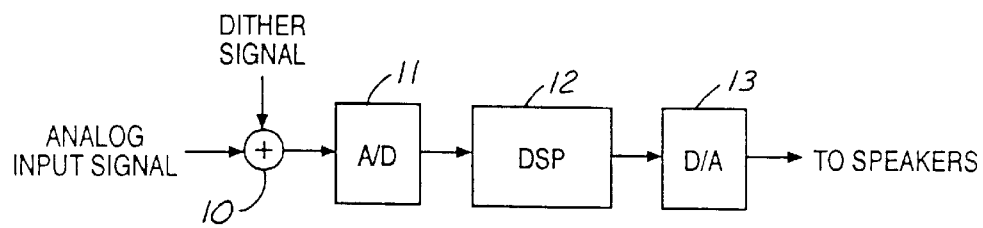
FIG. 1 is a block diagram showing a digital signal processing audio system using a dither signal.

Referring to FIG. 1, the prior art audio reproduction system using a dither signal is shown. An analog input signal has a dither signal added thereto in a summer 10 prior to being digitized in an analog-to-digital (A/D) converter 11. The digitized signal is processed in a digital signal processor DSP block 12 with resulting audio signals being converted back to analog form in a digital-to-analog (D/A) converter 13. The output analog signals then may be reproduced by speakers (not shown).

Prior art systems of the type shown in FIG. 1 have used various sources to generate a dither signal. Dither signals have been generated using both analog and digital circuits. When a digital circuit is used, the dither signal must be converted to analog form prior to adding it to the analog input signal.

Since the dither signal is present during the digitization process, the desired reduction of quantization error distortion is obtained. When the dither signal has been generated digitally, it is known in the art that the digital dither signal may be subtracted from the digitized signal to reduce the noise impact on the signal. On the other hand, if the signal being digitized has a bandwidth characteristic such that the entire frequency range within the bandwidth of the A/D converter is not used, then the dither signal can be placed in the unused frequencies only. This avoids adding noise to the signals of interest. Consequently, bandpass filtering of the signal of interest removes the dither after digitization, and no subtraction is necessary.

Figure 2:
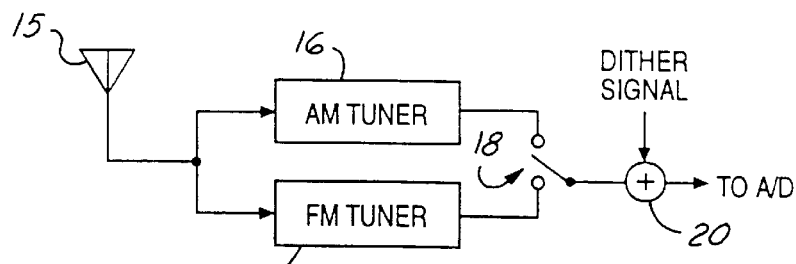
FIG. 2 is a block diagram showing a portion of an AM/FM radio receiver as used in the present invention.
Figure 3:
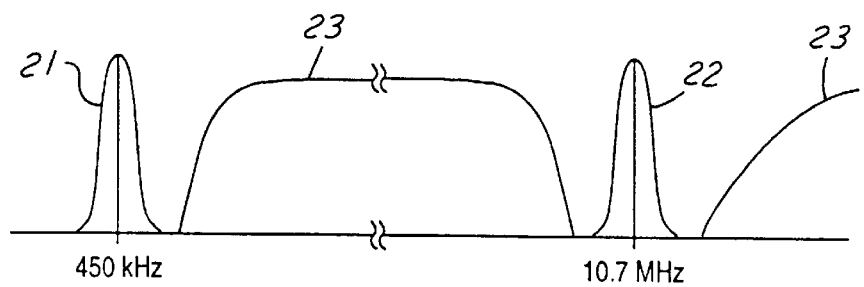
FIG. 3 is a frequency diagram showing the intermediate frequency signals of the AM and FM tuner and the desired spectral shape of a dither signal.

A preferred embodiment of the present invention relates to an AM/FM radio receiver as partially shown in FIG. 2. A reception antenna 15 provides radio frequency broadcast signals to an AM tuner 16 and an FM tuner 17. Tuners 16 and 17 are analog circuits which provide analog intermediate frequency (IF) signals to a multiplex switch 18 which selects either the AM IF signal or the FM IF signal and provides the selected signal to one input of a summer 20. A dither signal is provided to the other input of summer 20 and the resulting sum is provided to an A/D converter in the manner of FIG. 1. The AM and FM tuners preferably provide IF output signals at conventional IF frequency values as shown in FIG. 3. Thus, an AM IF signal 21 has a center frequency of 450 kHz and an FM IF signal 22 has a center frequency of 10.7 MHz. Thus, a dither signal is desired for this radio receiver having a frequency spectrum 23 characterized by notches coinciding with the frequency ranges of the IF signals.

For digitally generated dither signals, the sample rate of the digital dither signal should be at least as high as the sample rate of the A/D converter. In the preferred embodiment, an A/D converter sample rate of about 40 MHz is used in order to provide adequate oversampling of the 10.7 MHz FM IF signal.

Figure 4:
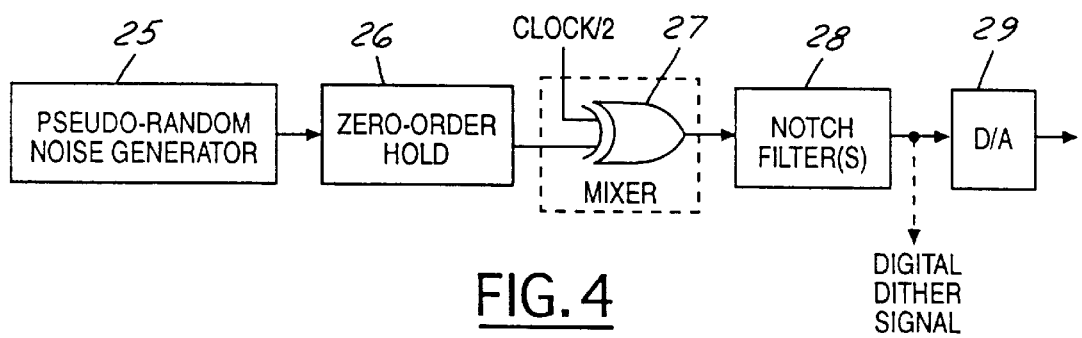
FIG. 4 is a block diagram showing a preferred embodiment of the dither signal source of the present invention.

A preferred embodiment of the invention generates a spectrally-shaped dither signal in the manner shown in FIG. 4. The components shown in FIG. 4 can be implemented in a hardware-efficient manner and may be easily included in the DSP block of the receiver.

Selecting one bit of a pseudo-random noise generator (PRNG) 25 generates an approximately white-noise single-bit stream. PRNG 25 is preferably comprised of a linear feedback shift register (LFSR) to generate the pseudo-random noise sequence, as is generally known in the art, although any technique for generating a digital random noise sequence can be employed. Preferably, a 22-bit linear feedback shift register is used, implementing a 22nd order polynomial such as is specified in W. Peterson, ERROR-CORRECTING CODES, MIT Press. A detector may optionally be employed in connection with the LFSR to detect illegal states (such as an all one or an all zero state, depending upon the LFSR used) and to force the LFSR back to its normal operating mode and prevent it from becoming locked up.

The sample rate of the A/D converter (and the rate of the final digital dither signal) is designated $f_s$ (which is about 40 MHz in the preferred embodiment). The shift register of PRNG 25 is clocked at a slower sample rate designated $f_n$ where $$f_n = \frac{f_s}{n}$$

and where n is equal to an integer. In a preferred embodiment, the value of n is 4, and the PRNG 25 is clocked at one-fourth of the main sample rate $f_s$. The resulting digital pseudo-random noise sequence is input to a zero-order hold 26 which produces a held output for n samples at the sample rate $f_s$. The zero order hold is equivalent to convolving in time the noise sequence upsampled by n with a sequence of n pulses, which provides the frequency response of a sinc function. Thus, a modified pseudo-random noise sequence having a spectral shape including at least one notch is generated. The notch center frequencies are located at $$\frac{f_s}{n} \cdot k.$$

If n is greater than 2, then there will be more than one notch. If n is even, then k goes from 1 to $$\frac{n}{2},$$

and if n is odd, then k goes from 1 to $$\frac{n-1}{2}.$$

If only one notch is desired with a frequency at or near one of the frequencies $$\frac{f_s}{n} \cdot k,$$

then the output of zero-order hold 26 can provide the final noise sequence desired. However, notches at other locations can be obtained by frequency shifting the notch or adding notches using further processing as shown in FIG. 4. Thus, the output of zero-order hold 26 is connected to one input of an exclusive-OR (XOR) gate 27 which acts as a mixer. A second input of XOR gate 27 receives a clock÷2 signal, i.e., a square wave at $$\frac{f_s}{2}.$$

The mixing by XOR gate 27 in the preferred embodiment reverses in frequency the noise spectrum such that notches are formed in the spectrum at DC and at $$\frac{f_s}{4}.$$

Thus the resulting dither signal has low energy content at low frequencies (e.g., 450 kHz for the AM IF signal) and at frequencies near $$\frac{f_s}{4}$$

(e.g., 10.7 MHz for the FM IF signal).

If dither signal energy is still not reduced enough in the frequency bands of interest, then additional notch filtering is performed by notch filters 28. Alternatively, notch filters 28 could be placed in front of mixer 27, although a less efficient mixing technique may then be required.

A digital dither signal is produced at the output of notch filter 28 (or at the outputs of mixer 27 or zero-order hold 26 depending on a particular embodiment). The digital dither signal may be employed directly in digital form for reducing quantization error in digital truncation operations. For A/D conversion operations, such as in the preferred embodiment, a digital-to-analog converter 29 converts the digital dither signal to an analog dither signal for adding to the analog input signal as shown in FIG. 2.

Operation of FIG. 4 will be described in further detail with reference to the frequency diagrams of FIGS. 5–9.

Figure 5:
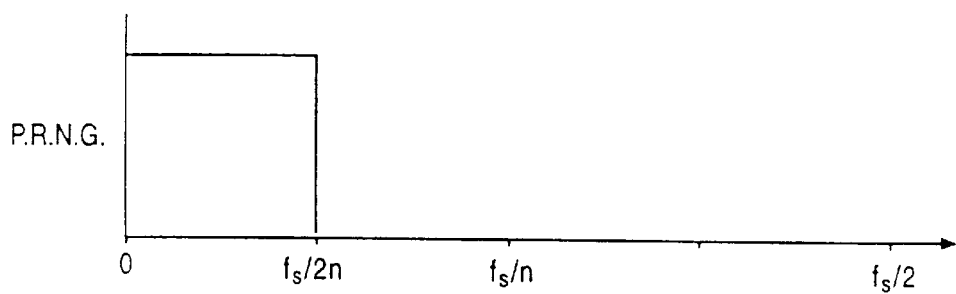
FIG. 5 is a frequency spectrum of the pseudo-random noise signal.

As shown in FIG. 5, the unaliased frequency spectrum from zero up to a frequency of $$\frac{f_s}{2n}$$

is shown. PRNG 25 operates at a speed of $f_n$, where $$f_n = \frac{f_s}{n}$$

(specifically shown as $$\frac{f_s}{4}$$

in FIG. 5). In general, the frequency spectrum of the pseudo-noise sequence goes from zero up to $$\frac{f_s}{2n}.$$

Figure 6:
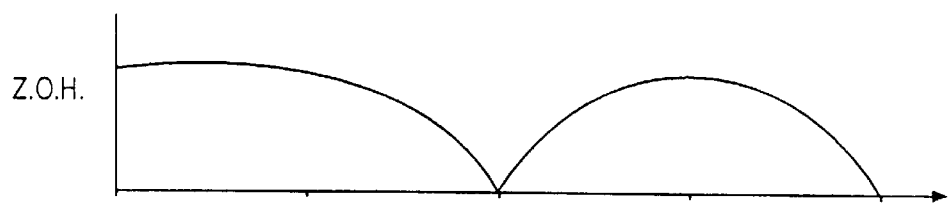
FIG. 6 is a frequency spectrum of the output of the zero-order hold.

As shown in FIG. 6, zero-order hold 26 modifies the pseudo-random noise sequence such that a frequency spectrum having zeros at $$\frac{f_s}{4} \text{ and } \frac{f_s}{2}$$

results.

Figure 7:
FIG. 7 is a frequency spectrum of the mixing injection signal used in FIG. 4.

FIG. 7 shows the frequency of the mixing injection signal at clock÷2 in this case equal to $$\frac{f_s}{2}.$$

Figure 8:
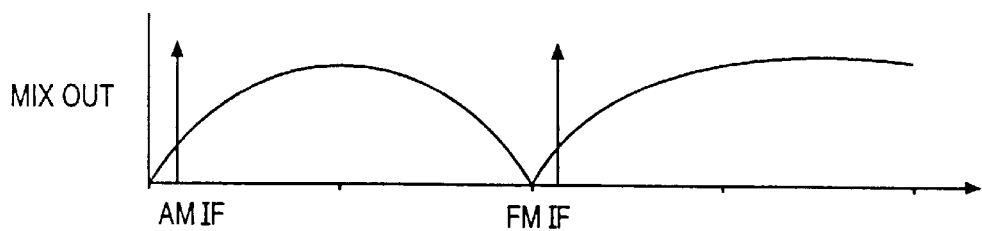
FIG. 8 is a frequency spectrum of the output signal of the mixer of FIG. 4.

The output of the mixer XOR gate is shown in FIG. 8. Thus, the frequency spectrum has been shifted such that zeros appear in the frequency spectrum at 0 (i.e., DC) and $$\frac{f_s}{n}.$$

These notches are near the AM IF and FM IF signals as shown.

Figure 9:
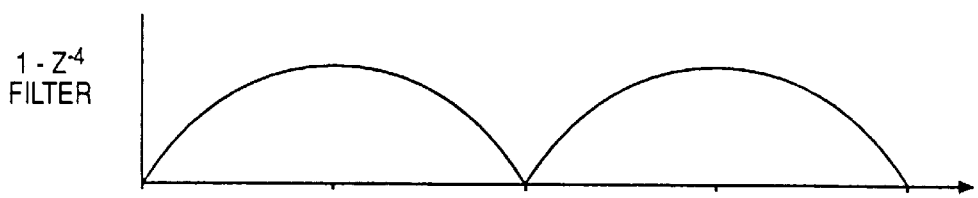
FIG. 9 is a frequency spectrum of a notch filter as used in FIG. 4.

The frequency spectrum of a notch filter having zeros at DC and $$\frac{f_s}{4}$$

is shown in FIG. 9. A simple finite impulse response (FIR) filter having a formula $1-z^{-4}$ is used. Furthermore, a series of cascaded filters (with the same or a different transfer function) may be used as desired. The notch filter or notch filters increase the notches, either in terms of their frequency bandwidth and/or their depth of attenuation.

Thus, a highly efficient approach for generating spectrally-shaped dither noise has been achieved. Further efficiency can be obtained by combining processing from the different sections within FIG. 4. For example, by selecting a notch filter which only has delay terms spaced at integer factors of n, the shift register of the PRNG can be used as the delay line of the notch filter. Cascaded notch filters can also take advantage of this optimization if they are first expanded to a single polynomial by multiplying their transfer functions together and simplifying.

In the case where a mix is performed between the notch filter and the PRNG with zero order hold, the effect of the mix on the filter must be taken into account when utilizing the foregoing optimization by performing the XOR mix function on each of the filter taps within the filter.

Another efficiency which may be achieved by selecting the notch filter delay terms spaced by integer factors of n, is to perform the filtering at the same low rate as the PRNG. For a given PRNG input to the filter, only a single filter output will be generated and repeated n cycles. This allows the calculation to be done at the lower rate. In the case where the mix exists between the notch filter and the PRNG with zero order hold, two possible alternating values will be output from the notch filter. These can be calculated at the lower rate, and be multiplexed in an alternating manner to generate an equivalent output of the notch filter.

In an alternative embodiment, the zero-order hold may be held for only m samples, where m is less than n. The effect of inserting 0's for the remaining sample(s) up to n is to replicate and compress the spectrum of the PRNG. Since the spectrum of the noise sequence is flat, the overall spectrum is not changed. Furthermore, the notch location(s) are not changed. However, the resulting signal level would be reduced, allowing a method to control the noise level by adjusting the ratio of m and n.

Although separate notches corresponding to AM IF and FM IF frequencies are simultaneously generated in the preferred embodiment, it is also possible to reconfigure the dither signal source for separate AM and FM modes to only generate the notch needed when in a particular mode.

What is claimed is:

1. A dither signal source for generating a dither signal in a digital processing system wherein a digital signal is processed having a sample rate $f_s$, and wherein said dither signal is spectrally shaped, said dither signal source comprising:

a digital random noise generator producing a digital random noise sequence at a sample rate $f_n$ where $$f_n = \frac{f_s}{n}$$

with n equal to an integer; and a zero-order hold receiving said digital random noise sequence and producing a held output for n samples at said sample rate $f_s$, said held output providing a modified digital random noise sequence having a spectral shape including at least one notch.

2. The dither signal source of claim 1 further comprising:

a mixer mixing said modified digital random noise sequence and a predetermined mixing signal to shift said notch to a predetermined frequency.

3. The dither signal source of claim 1 further comprising:

a notch filter coupled to said zero-order hold for increasing said notch.

4. The dither signal source of claim 1 wherein said digital random noise generator is comprised of a linear feedback shift register generating a pseudo-random noise sequence.

5. The dither signal source of claim 2 wherein said mixer is comprised of an exclusive-OR gate, and wherein said predetermined mixing signal is comprised of a square-wave signal.

6. The dither signal source of claim 1 wherein said digital signal is derived from sampling an analog input signal, and wherein said dither signal source is further comprised of a digital-to-analog converter for providing an analog dither signal to be added to said analog input signal.

7. A method of generating a spectrally-shaped dither signal in a digital processing system wherein a digital signal is processed having a sample rate $f_s$, said method comprising the steps of:

generating a pseudo-random noise sequence at a sample rate $f_n$, where $$f_n = \frac{f_s}{n}$$

with n equal to an integer;

holding said pseudo-random noise sequence in a zero-order hold for n samples at said sample rate $f_s$ to provide a modified pseudo-random noise sequence having a spectral shape including at least one notch; and adding said modified pseudo-random noise sequence to said digital signal.

8. The method of claim 7 further comprising the step of:

mixing said modified pseudo-random noise sequence with a predetermined mixing signal to shift said notch to a predetermined frequency.

9. The method of claim 7 further comprising the step of:

notch filtering said modified pseudo-random noise sequence to increase said notch.

10. A digital signal processing AM/FM radio receiver comprising:

an AM tuner generating an AM IF signal at an AM IF frequency;

an FM tuner generating an FM IF signal at an FM IF frequency;

an analog-to-digital converter for digitizing said AM IF signal and said FM IF signal;

digital processing means for processing said digitized AM and FM IF signals to recover audio information, said processing being performed at a sample rate $f_s$;

a pseudo-random noise generator producing a digital pseudo-random noise sequence at a sample rate $f_n$ where $$f_n = \frac{f_s}{n}$$

with n equal to an integer;

a zero-order hold receiving said pseudo-random noise sequence and producing a held output for n samples at said sample rate $f_s$, said held output providing a modified pseudo-random noise sequence having a spectral shape including notches for said respective AM IF frequency and said FM IF frequency;

a digital-to-analog converter generating an analog dither signal in response to said zero-order hold; and an adder for adding said analog dither signal to said AM IF signal and said FM IF signal prior to digitizing in said analog-to-digital converter.

11. The radio receiver of claim 10 further comprising:

a mixer mixing said modified pseudo-random noise sequence and a predetermined mixing signal to shift said notches to substantially coincide with said AM IF and FM IF frequencies.

12. The radio receiver of claim 11 further comprising:

a notch filter coupled to said mixer for increasing at least one of said notches.

* * * * *